(12) United States Patent
Shanker

(10) Patent No.: US 9,183,065 B1
(45) Date of Patent: Nov. 10, 2015

(54) PROVIDING ACCESS TO AN APPLICATION PROGRAMMING INTERFACE THROUGH A NAMED PIPE

(71) Applicant: Amazon Technologies, Inc., Seattle, WA (US)

(72) Inventor: Matthew Thomas Shanker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/666,517

(22) Filed: Nov. 1, 2012

(51) Int. Cl.
G06F 9/54 (2006.01)

(52) U.S. Cl.
CPC ............... *G06F 9/544* (2013.01); *G06F 9/541* (2013.01); *G06F 9/546* (2013.01)

(58) Field of Classification Search
CPC .......... G06F 9/544; G06F 9/541; G06F 9/546
See application file for complete search history.

(56) References Cited

U.S. PATENT DOCUMENTS

| | | | | |
|---|---|---|---|---|
| 6,049,798 | A * | 4/2000 | Bishop et al. | 1/1 |
| 6,170,045 | B1 * | 1/2001 | Bobak et al. | 711/169 |
| 6,247,057 | B1 * | 6/2001 | Barrera, III | 709/229 |
| 6,374,299 | B1 * | 4/2002 | Ford et al. | 709/227 |
| 6,438,146 | B1 * | 8/2002 | Brafford | 370/537 |
| 6,868,442 | B1 * | 3/2005 | Burdeau | 709/223 |
| 6,901,596 | B1 * | 5/2005 | Galloway | 719/330 |
| 7,293,145 | B1 * | 11/2007 | Baird et al. | 711/162 |
| 8,359,603 | B1 * | 1/2013 | McCann et al. | 719/312 |
| 2003/0182283 | A1 * | 9/2003 | Bean et al. | 707/6 |
| 2004/0148326 | A1 * | 7/2004 | Nadgir et al. | 709/200 |
| 2006/0150200 | A1 * | 7/2006 | Cohen et al. | 719/328 |
| 2006/0168646 | A1 * | 7/2006 | Werner | 726/4 |
| 2007/0101341 | A1 * | 5/2007 | Downing et al. | 719/314 |
| 2007/0136356 | A1 * | 6/2007 | Smith et al. | 707/102 |
| 2010/0250776 | A1 * | 9/2010 | Lev | 709/238 |
| 2011/0087919 | A1 * | 4/2011 | Deshmukh et al. | 714/4.21 |
| 2012/0191860 | A1 * | 7/2012 | Traversat et al. | 709/226 |
| 2013/0262555 | A1 * | 10/2013 | Hochmuth | 709/201 |
| 2014/0109107 | A1 * | 4/2014 | Wilkinson et al. | 719/313 |

FOREIGN PATENT DOCUMENTS

CN 101729415 * 9/2010 ............. H04L 12/56

OTHER PUBLICATIONS

"Named Pipe", Wikipedia [online][retrieved on Oct. 12, 2012]retrieved from: http://en.wikipedia.org/wiki/Named_pipe 4 pps.

* cited by examiner

*Primary Examiner* — Charles E Anya
(74) *Attorney, Agent, or Firm* — Lee & Hayes, PLLC

(57) ABSTRACT

An API calling process creates a named pipe through which a program can submit data to an application programming interface ("API"). Appropriate permissions are set on the named pipe such that only authorized applications can write data to the named pipe. When data is written to the named pipe, the written data is piped to the API calling process. The API calling process may process the written data, such as by placing the data into an appropriate format for submission to an API. The API calling process then utilizes appropriate credentials to call an API with the data written to the named pipe. For example, the API calling process might utilize service credentials to make a Web services API call to submit the data written to the named pipe to a Web services API exposed by a network service.

19 Claims, 8 Drawing Sheets

PROVIDING ACCESS TO AN APPLICATION PROGRAMMING INTERFACE THROUGH A NAMED PIPE

BACKGROUND

Creating program code for utilizing an application programming interface ("API") can be difficult and time consuming. For instance, in order for a programmer to program an application to utilize an API, such as a World Wide Web ("Web") service API, it may be necessary for the programmer to understand a network stack, various protocols, and the format and use of the API itself. The complexity in creating program code for accessing and utilizing certain APIs might discourage programmers from utilizing the APIs, especially when the APIs are not related to the core functionality of an application.

It is with respect to these and other considerations that the disclosure made herein is presented.

DETAILED DESCRIPTION

Figure 1:
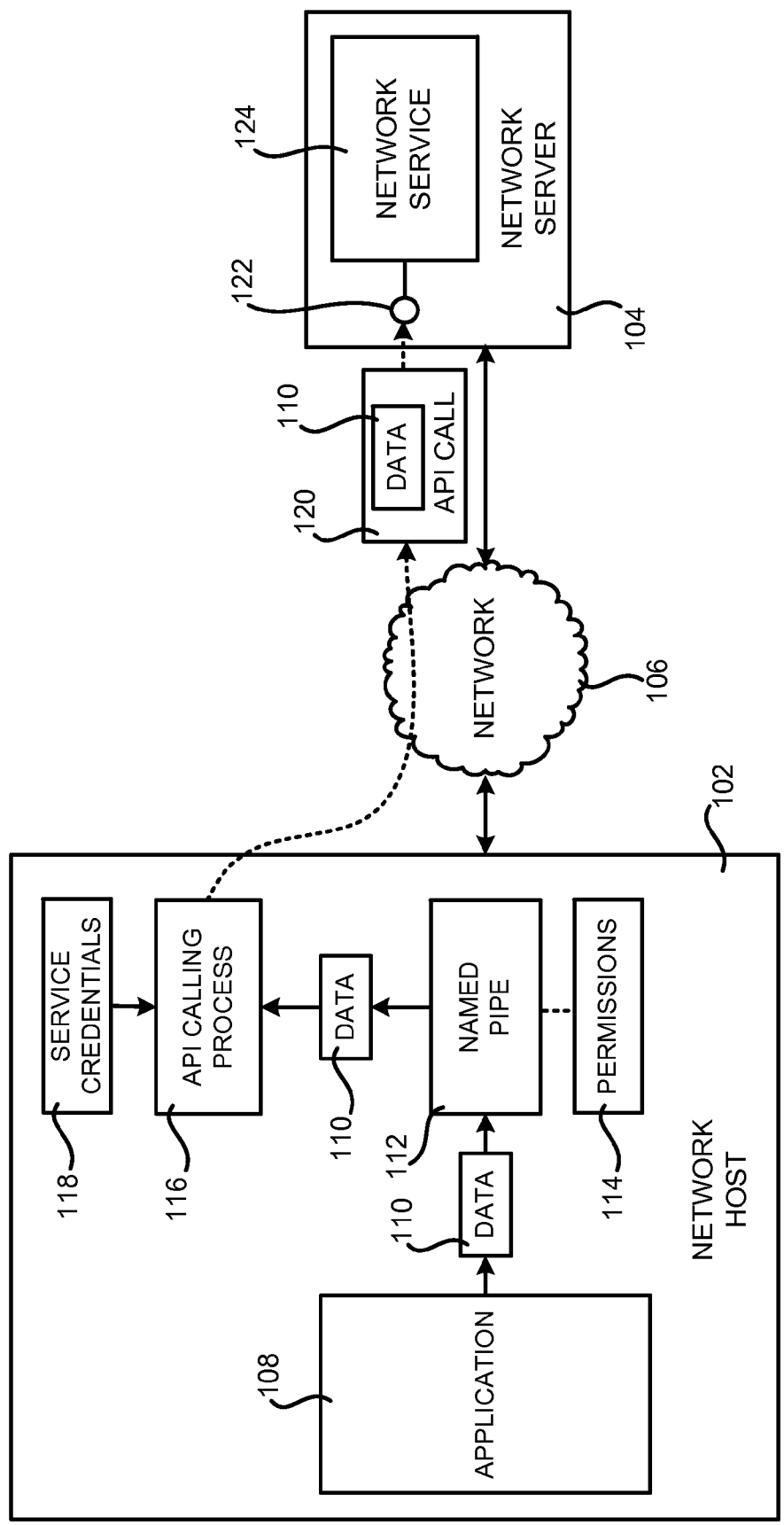
FIGS. 1 and 2 are system diagrams showing aspects of one illustrative mechanism disclosed herein for providing access to an API through a named pipe.

The following detailed description is directed to technologies for providing access to an API through a named pipe. Utilizing the technologies described herein, a program can access an API, such as a Web service API, by writing data to a named pipe. By utilizing a named pipe in this manner, a programmer can be freed from the typical complexity of generating program code for accessing an API. Additional details regarding these and other aspects of the concepts and technologies disclosed herein for providing access to an API through a named pipe are provided below.

According to one aspect presented herein, a computer program, referred to herein as an API calling process, creates a named pipe on a network host. A named pipe is a file in a filesystem that can be utilized to transfer data from one program to another program. Using a named pipe, information written to the named pipe by one program can be transferred to another program without creating an intermediate temporary file. In the embodiments presented herein, processes such as application programs executing on the network host, can write data to the named pipe that then is piped to the API calling process.

In one embodiment, filesystem permissions are set on the named pipe to restrict write access to the named pipe to one or more applications executing on the network host. The applications authorized to write to the named pipe are those applications that are also authorized to access an API, such as a Web service API exposed by a network service. In this way, a mapping can be created between filesystem permissions on the named pipe to credentials for accessing an API. It should be appreciated that other types of APIs in addition to Web service APIs might also be accessed through a named pipe in a similar manner.

In some embodiments, the named pipe is stored in a filesystem directory that is associated with an API. In this way, a mapping can be created between locations in a filesystem and APIs, such as Web service APIs. Additionally, multiple instances of the API calling process along with multiple associated named pipes might be created on the same host.

When an application with appropriate permissions writes data to the named pipe, the written data is piped to the API calling process. In response to receiving the written data, the API calling process utilizes a set of service credentials to perform an API call containing the written data. For instance, the API calling process might utilize the service credentials to perform a Web service API call that includes the written data to a Web service API exposed by a network service. Other types of credentials might also be utilized to submit data written to a named pipe to other types of APIs.

In some embodiments, the API calling process performs processing on the data written to the named pipe prior to generating an API call with the written data. For example, the API calling process might place the data written to the named pipe into a format suitable for submission to an API if the data is not already in an appropriate format. The API calling process might also batch the data written to the named pipe with other data written to the named pipe for submission to the API. In this way, the processing and network load on the network host executing the API calling process might be reduced. The API calling process might also perform other types of processing on data written to a named pipe prior to submitting the data to an API.

In some implementations, an application writes metrics associated with the execution of the application to the named pipe. In this way, the application can easily submit metrics to an API configured to collect, aggregate, and analyze the metrics. In other implementations, an application writes log data associated with the execution of the application to the named pipe. In this way, an application log can easily be easily submitted to an API configured to collect and analyze application logs. Other types of data might also be written to a named pipe and submitted to an API in other embodiments.

In some implementations, multiple applications might write data to the same named pipe. In these implementations, the API calling process might examine the written data to identify the application that wrote the data to the named pipe. The API calling process might also identify the destination API for the written data based upon the contents of the written data, which might include data specifying the identity of the application that wrote the data to the named pipe.

In other embodiments, a single instance of the API calling process might receive data written to multiple named pipes. In this embodiment, the API calling process might identify the application writing the data and the destination API for the data based upon the named pipe to which the data was written. Appropriate credentials for accessing an API might also be selected based upon the calling application, the named pipe to which data was written, the contents of the data, or in another manner. Additional details regarding the various components and processes described above for accessing an API through a named pipe will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a system diagram showing aspects of one illustrative mechanism disclosed herein for accessing an API through a named pipe. As shown in FIG. 1, a network host 102 is configured to communicate with a network server 104 by way of a network 106. The network host 102 and the network server 104 may be server computers or other types of computing devices configured to perform the functionality described herein. The network 106 may be a local area network ("LAN"), a wide area network ("WAN") such as the Internet, or a combination of networks. It should be appreciated that the configuration of the network host 102, the network server 104, and the network 106 shown in FIG. 1 have been simplified for discussion purposes. These elements may include many more components than shown in FIG. 1.

As also illustrated in FIG. 1, the network host 102 is configured in one embodiment to execute an API calling process 116. As will be described in greater detail herein, the API calling process 116 is configured to create a named pipe 112 on the network host 102. As mentioned briefly above, a named pipe is a file in a filesystem that can be utilized to transfer data from one program to another program. Using a named pipe, information written to the named pipe 112 by one program can be transferred to another program without creating an intermediate temporary file. For instance, in the embodiments presented herein, an application 108 executing on the network host 102 can write data 110 to the named pipe 112 that is piped to the API calling process 116. Additional details regarding this process will be provided below.

In the embodiment shown in FIG. 1, the API calling process 116 is also configured to generate and make an API call 120 to an API 122 exposed by a network service 124 executing on the network server 104. As will be described in greater detail herein, the API call 120 includes the data 110 written to the named pipe by the application 108. By allowing an application 108 to provide the data 110 to the API 122 by writing the data 110 to the named pipe 112, the programmer of the application 108 is freed from the complexities of the API 122. Rather, the programmer only needs to configure the application 108 to write the data 110 to the named pipe 112. Additional details regarding these processes will be provided below with regard to FIGS. 2-8.

As also illustrated in FIG. 1, the API calling process 116 might set permissions 114 on the named pipe 112. The permissions 114 describe the access rights that programs and users have to write to the named pipe 112. For example, the API calling process 116 may set the permissions 114 such that only applications configured to make an API call 120 to the API 122 have permissions 114 to write to the named pipe 112. In the example shown in FIG. 1, for instance, the permissions 114 may be set such that only the application 108 has permissions 114 to write to the named pipe 112. In one implementation, the permissions 114 are UNIX permissions, such as user or group filesystem permissions. In this implementation, a mapping can be effectively created between the UNIX group permissions and an API permission structure, such as API service credentials. This mechanism is described in greater detail below.

In some embodiments, the API calling process 116 also utilizes service credentials 118 to perform the API call 120 to the API 122. The service credentials 118 are credentials for accessing the network service 124. By utilizing credentials 118 in this way, an informal mapping is created between the permissions 114 and the credentials 118 utilized to access the network service 124. In the example shown in FIG. 1, only a single set of service credentials 118 is utilized to perform an API call 120 to the API 122. In other embodiments described below, however, the API calling process 116 might maintain multiple sets of service credentials 118 and select the appropriate service credentials 118 for a particular API call 120 based upon the contents of the data 110, the named pipe 112 to which data 110 is written, the API 122 that is being called, and/or other factors.

In the example shown in FIG. 1, the API 122 is a Web service API exposed by the network service 124. It should be appreciated, however, that the embodiments described herein might be utilized with other types of APIs other than Web service APIs. For instance, the embodiments disclosed herein might be utilized with APIs exposed by programs executing on the network host 102, by an operating system, or by other types of programs using other types of APIs.

As will also be described in greater detail below, the API calling process 116 might perform various types of processing on the data 110 prior to generating the API call 120 with the data 110. For instance, the API calling process 116 might perform various translations, formatting operations, and/or aggregation operations on the data 110. As an example, the API calling process 116 might format the data 110 so that the data 110 is in a format suitable for submission to the API 122.

The API calling process 116 might also batch the data 110 written to the named pipe 112 with other data written to the named pipe 112 for submission to the API 122. In this way, the API calling process 116 might reduce the processing and network load on the network host 112 as a result of the calls to the API 122. In some implementations, the API calling process 116 might discard data that has been batched with other data when the data has expired prior to calling the API 122. In this way, expired data is not submitted to the API 122. The API calling process 116 might communicate with the submitting application in order to determine if data has expired. The API calling process 116 might also perform other types of processing on the data 110 prior to calling the API 122.

In some implementations, the data 110 written to the named pipe 112 by the application 108 is metrics data related to the execution of the application 108. In other implementations, the data 110 is log data relating to the execution of the application 108. It should be appreciated, however, that these examples are merely illustrative, and that other types of data may be submitted to the API 122 in the manner described herein.

Additionally, although an application 108 is illustrated in FIG. 1 as writing to the named pipe 112, any type of process executing on a computing device, may write data to a named pipe 112 in the manner described herein. In this regard, it should be appreciated that the embodiments disclosed herein are not limited to use with an application 108, a Web service API, or server computers operating in a network environment. Additional details regarding these and other aspects of the mechanism disclosed herein for providing access to an API through a named pipe 112 will be provided below with regard to FIGS. 2-7.

Figure 2:
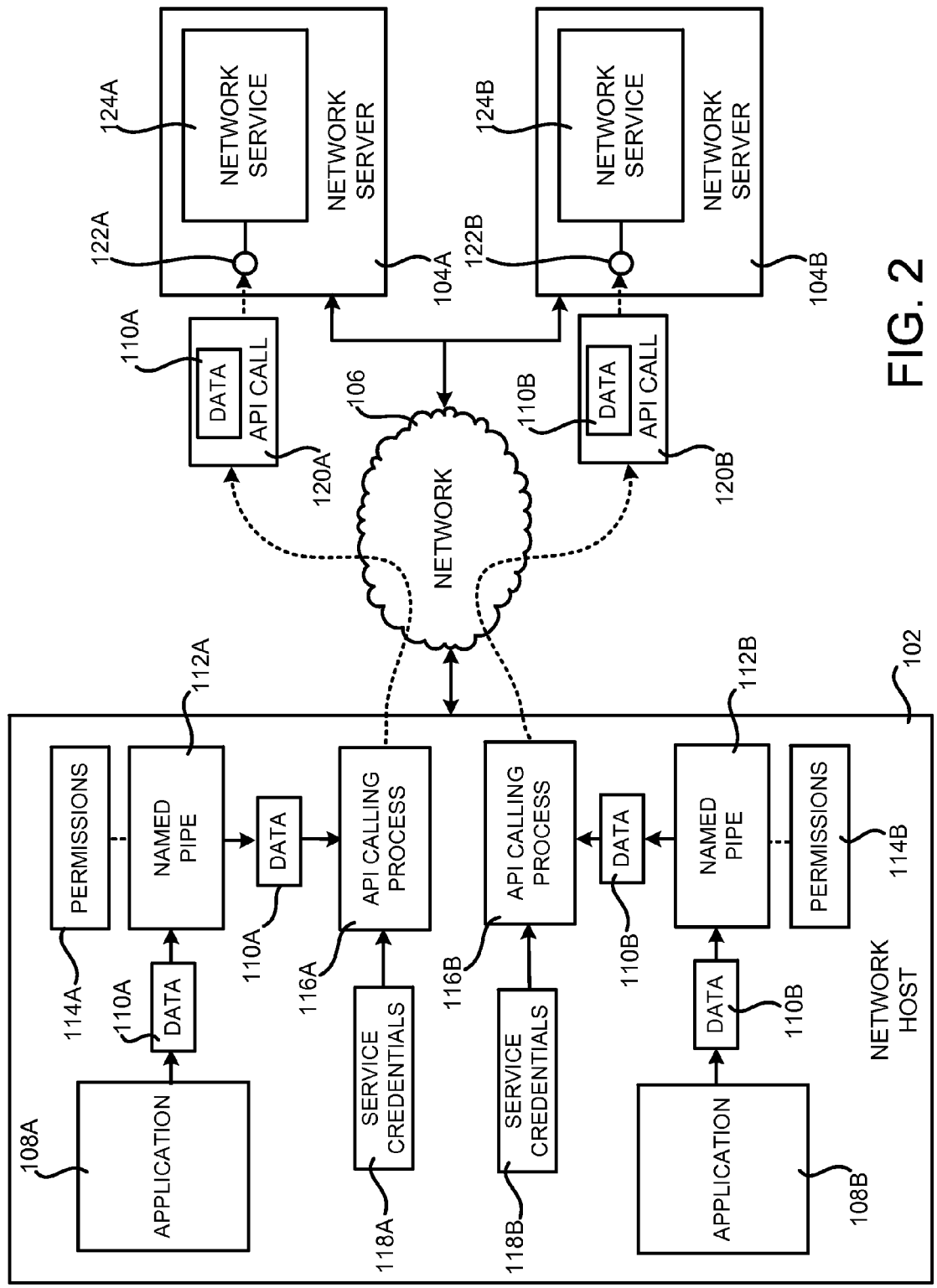

FIG. 2 is a system diagram showing aspects of one illustrative mechanism disclosed herein for providing access to an API 122 through a named pipe 112. In the example shown in FIG. 2, two instances of the API calling process 116A-116B are executing on the network host 102. Each of the API calling processes 116A-116B is configured to generate API calls 120A-120B, respectively, to different APIs 122A-122B. In the example shown in FIG. 2, a network service 124A executing on a network server 104A exposes the API 122A and a network service 124B executing on a network server 104B exposes the API 122B.

As shown in FIG. 2, an application 108A can write data 110A to a named pipe 112A created by an API calling process 116A. The permissions 114 associated with the named pipe 112A allow the application 108A to write the data 110A to the named pipe 112A. The data 110A is then piped to the API calling process 116A which, in turn, utilizes the service credentials 118A to generate an API call 120A including the data 110A to the API 122A.

In a similar fashion, the API calling process 116B creates the named pipe 112B and associates permissions 114B with the named pipe 112B that provide write access to the named pipe 112B to the application 108B. The application 108B can then write data 110B to the named pipe 112B, which, in turn, is piped to the API calling process 116B. The API calling process 116B then utilizes the service credentials 118B to generate an API call 120B containing the data 110B to the API 122B.

In the manner illustrated in FIG. 2, multiple instances of the API calling process 116 can be executed on a single network host 102. Each instance of the API calling process 116 can be configured to call an API 122 exposed by a different network service 124. Additionally, each API calling process 116 can be configured with appropriate service credentials 118 for accessing the associated API 122.

It should be appreciated that although two instances of the API calling process 116 are shown in FIG. 2 as executing on the network host 102, many more such instances of the API calling process 116 might be executed in other embodiments. These instances of the API calling process 116 might perform API calls 120 to a like, or different number, of APIs 122 exposed by network services 124 executing on the same or different network servers 104. As mentioned above, calls might also be made in a similar fashion to other types of APIs in other embodiments.

Figure 3:
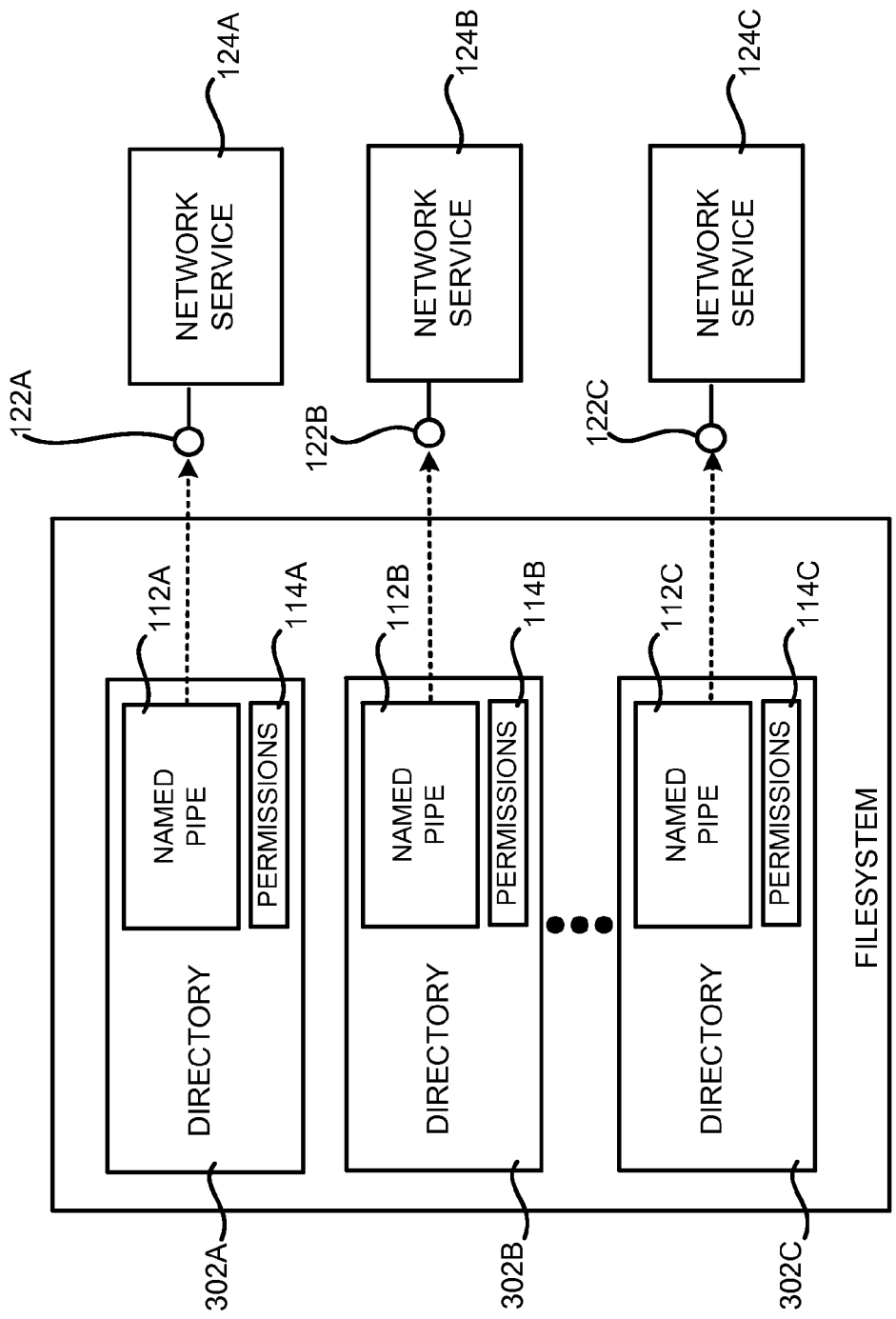
FIG. 3 is a filesystem diagram showing details of a filesystem utilized to represent the logical structure of one or more Web service APIs, according to one embodiment disclosed herein.

FIG. 3 is a filesystem diagram showing details of a filesystem utilized to represent the logical structure of one or more Web service APIs 122, according to one embodiment disclosed herein. In particular, the filesystem illustrated in FIG. 3 is configured to create a representation of the structure of the APIs 122A-122C exposed by the network services 124A-124C respectively.

In order to represent the logical structure of the APIs 122A-122C, named pipes 112A-112C have been created in directories 302A-302C respectively. The directory 302A and the named pipe 112A correspond to the API 122A exposed by the network service 124A. Similarly, the directory 302B and the named pipe 112B correspond to the API 122B exposed by the network service 124B. Likewise, the directory 302C and the named pipe 112C correspond to the API 122C exposed by the network service 124C. As also shown in FIG. 3, each of the named pipes 112A-112C have associated permissions 114A-114C, respectively, that provide write access to the named pipes 112A-112C to certain applications or processes.

By configuring the filesystem shown in FIG. 3 in the manner described above, the logical structure of the APIs 122A-122C of the network services 124-124C can be represented. This may assist applications 108 or other processes that write data to the named pipes 112A-112C in discovering the structure of the APIs 122A-122C exposed by the network services 124A-124C. In this regard, it should be appreciated that the filesystem shown in FIG. 3 has been simplified for discussion purposes and that many levels of directories 302 and named pipes 112 might be created within the filesystem to represent an arbitrary structure of a group of APIs 122. Moreover, it should also be appreciated that a single named pipe 112 might be utilized to call, access, and/or otherwise utilized multiple aspects of an API 122 provided by a network service 124.

Figure 4:
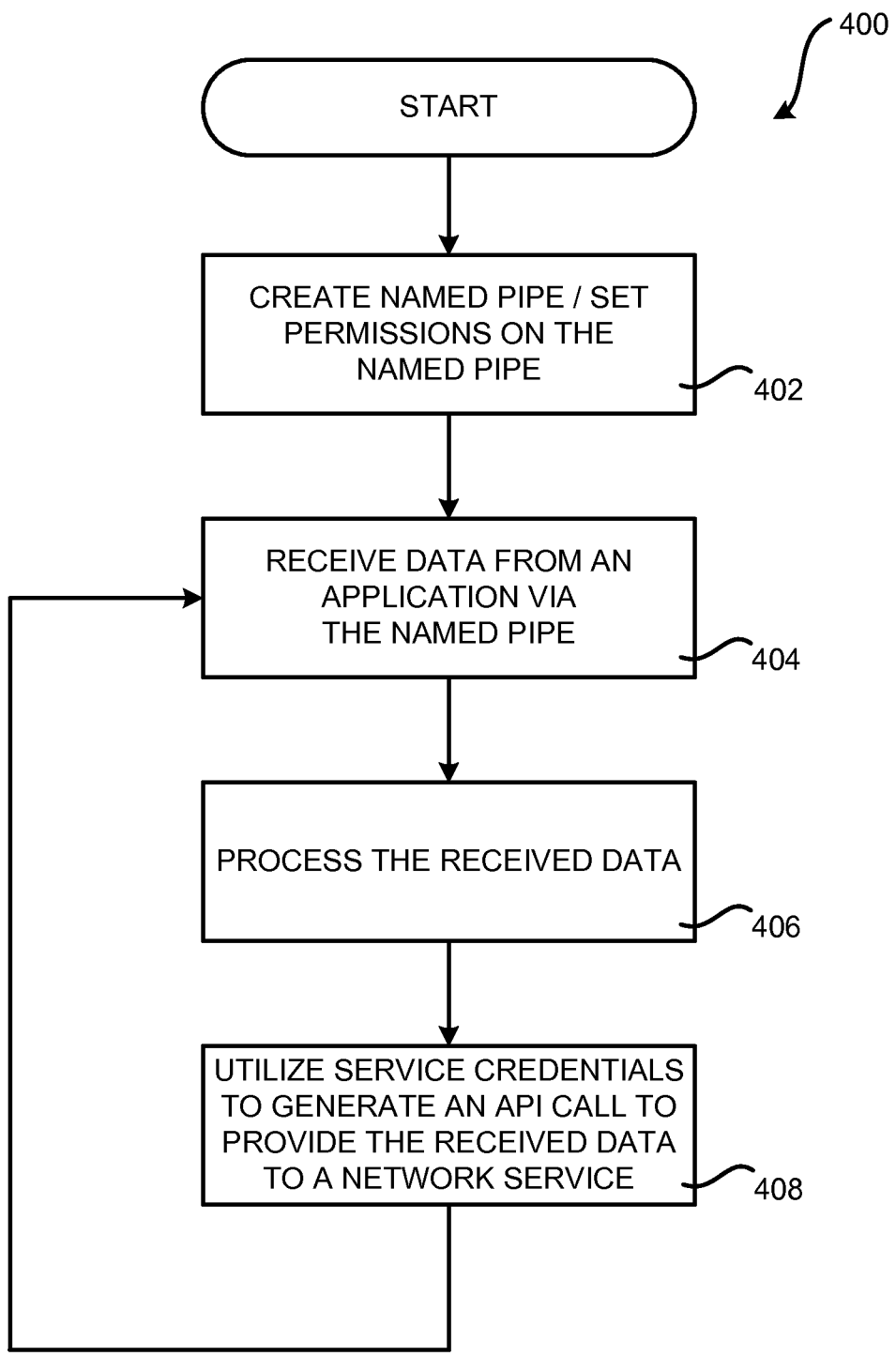
FIG. 4 is a flow diagram showing an illustrative routine that describes aspects of the operation of the mechanism shown in FIGS. 1 and 2 for providing access to an API through a named pipe.

FIG. 4 is a flow diagram showing a routine 400 that illustrates additional aspects of the mechanism shown in FIGS. 1-3 for providing access to an API 122 through a named pipe 112, according to one embodiment presented herein. It should be appreciated that the logical operations described herein with respect to FIG. 4 and the other figures are implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. Some operations might also be performed in parallel, or in a different order than those described herein.

The routine 400 begins at operation 402, where the API calling process 116 creates the named pipe 112. The API calling process 116 also sets the permissions 114 on the named pipe 112, thereby providing write access to the named pipe 112 to authorized applications 108. It should be appreciated that processes other than the API calling process 116 might create the named pipe 112 and set or modify the permissions 114. Additionally, the named pipe 112 and permissions 114 may be created and specified by an administrator of the computing system upon which the named pipe 112 is created.

From operation 402, the routine 400 proceeds to operation 404 where an application 108 writes data 110 to the named pipe 112. The data 110 is then piped to the API calling process 116. In response to receiving the data 110, the routine 400 proceeds to operation 406, where the API calling process 116 processes the received data 110. As discussed above, the API calling process 116 might perform various types of processing on the data 110. For example, the API calling process 116 may translate the data 110 to a format appropriate for submission to the API 122. The API calling process 116 might also perform other types of formatting operations on the received data 110. The API calling process 116 might also batch the data 110 for submission to the API 122 with other data. Other types of processing might also be performed.

From operation 406, the routine 400 proceeds to operation 408, where the API calling process 116 utilizes the service credentials 118 to create an API call 120 that includes the data 110. The API call 120 is then made to the API 122 exposed by the network service 124 in one embodiment. As discussed above, the embodiments disclosed herein are not limited to performing API calls 120 to a Web service API. Other types of API calls 120 might also be made to other types of APIs utilizing the mechanism described herein. From operation 408, the routine 400 proceeds back to operation 408, where additional data 110 may be received by way of the named pipe 112 and processed by the API calling process 116 in the manner described above.

Figure 5:
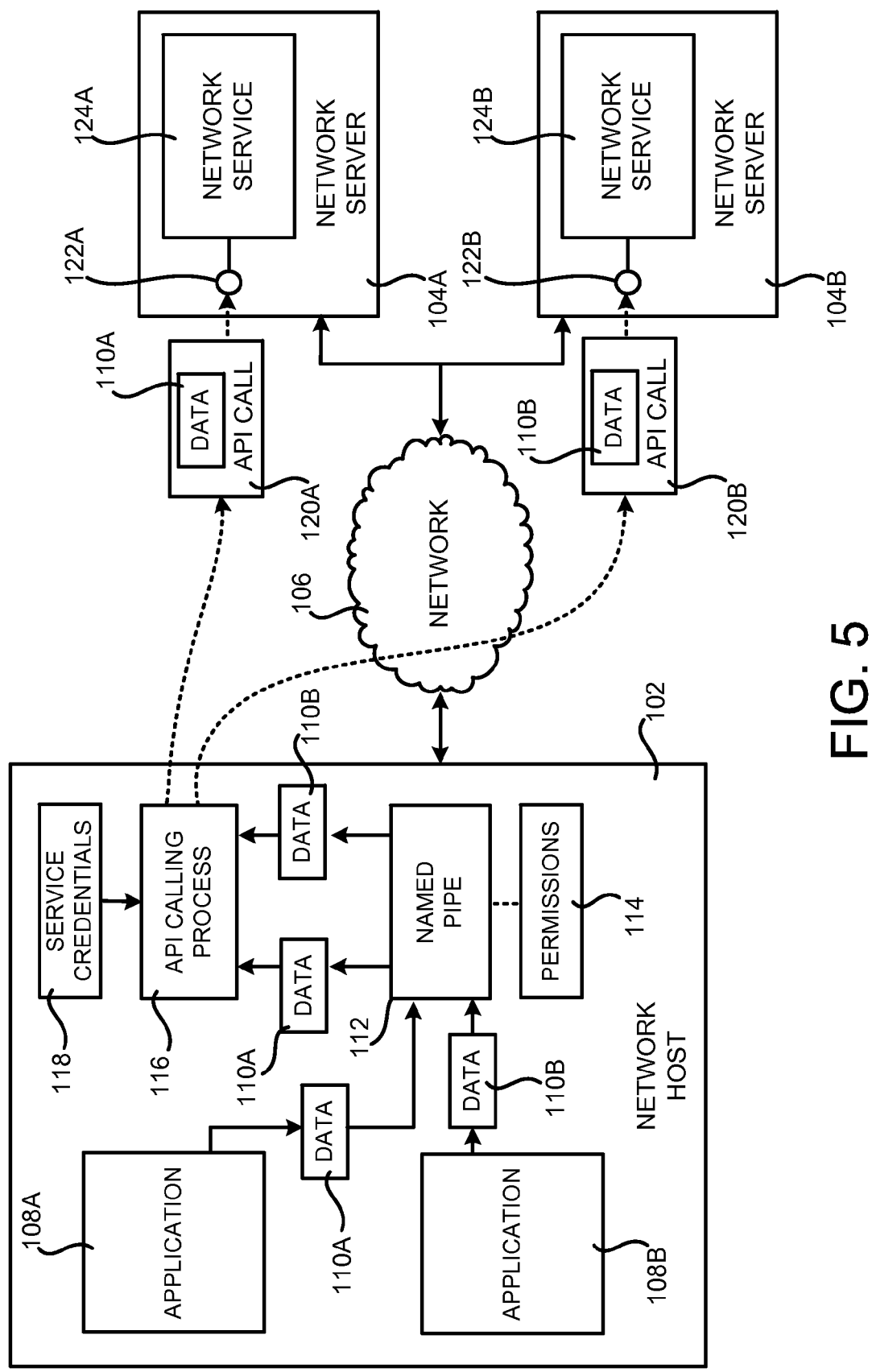
FIGS. 5 and 6 are system diagrams showing aspects of another illustrative mechanism presented herein for providing access to an API through a named pipe.

FIG. 5 is a system diagram showing aspects of another illustrative mechanism presented herein for providing access to an API 122 through a named pipe 112. In the embodiment shown in FIG. 5, multiple applications 108A-108B can write data 110A-110B, respectively, to the same named pipe 112. The named pipe 112 pipes the data 110A-110B to the API calling process 116.

In response to receiving the data 110A or the data 110B, the API calling process 116 identifies the application 108A-108B that submitted the data to the named pipe 112 through an analysis of the data 110A-110B. For instance, the data 110A-110B might include data that identifies the application 108A-108B that wrote the data 110 to the named pipe 112. Other mechanisms might also be utilized by the API calling process 116 to identify the particular application 108A or 108B that wrote the data 110 to the named pipe 112.

In one implementation, the API calling process 116 utilizes the same service credentials 116 to generate API calls 120A-120B for both of the applications 108A-108B. In other embodiments, however, the service credentials 108 comprise a list of credentials corresponding to each of the applications 108A-108B. In this way, the API calling process 116 can utilize different service credentials 118 for each of the applications 108A-108B.

The API calling process 116 might also determine which of multiple APIs 122A-122B to call for a particular application 108-108B. This determination might be made based upon the application 108A-108B that submitted data 110 to the named pipe 112. For instance, the API calling process 116 might be configured to make an API call 120A to the API 122A when data 110A is received from the application 108A. Similarly, the API calling process 116 might be configured to make an API call 120B, including the data 110B when an application 108B writes the data 110B to the named pipe 112. The API calling process 116 might also be configured to call other APIs when data is written to the named pipe 112 by other applications.

Although only two applications 108A-108B are illustrated in FIG. 5 as writing data to the named pipe 112, it should be appreciated that many more such applications 108 might write data to the named pipe 112 in other embodiments. In this way, a single named pipe 112 and a single instance of the API calling process 116 can be utilized to generate a multitude of API calls 120 to a multitude of APIs 122.

Figure 6:
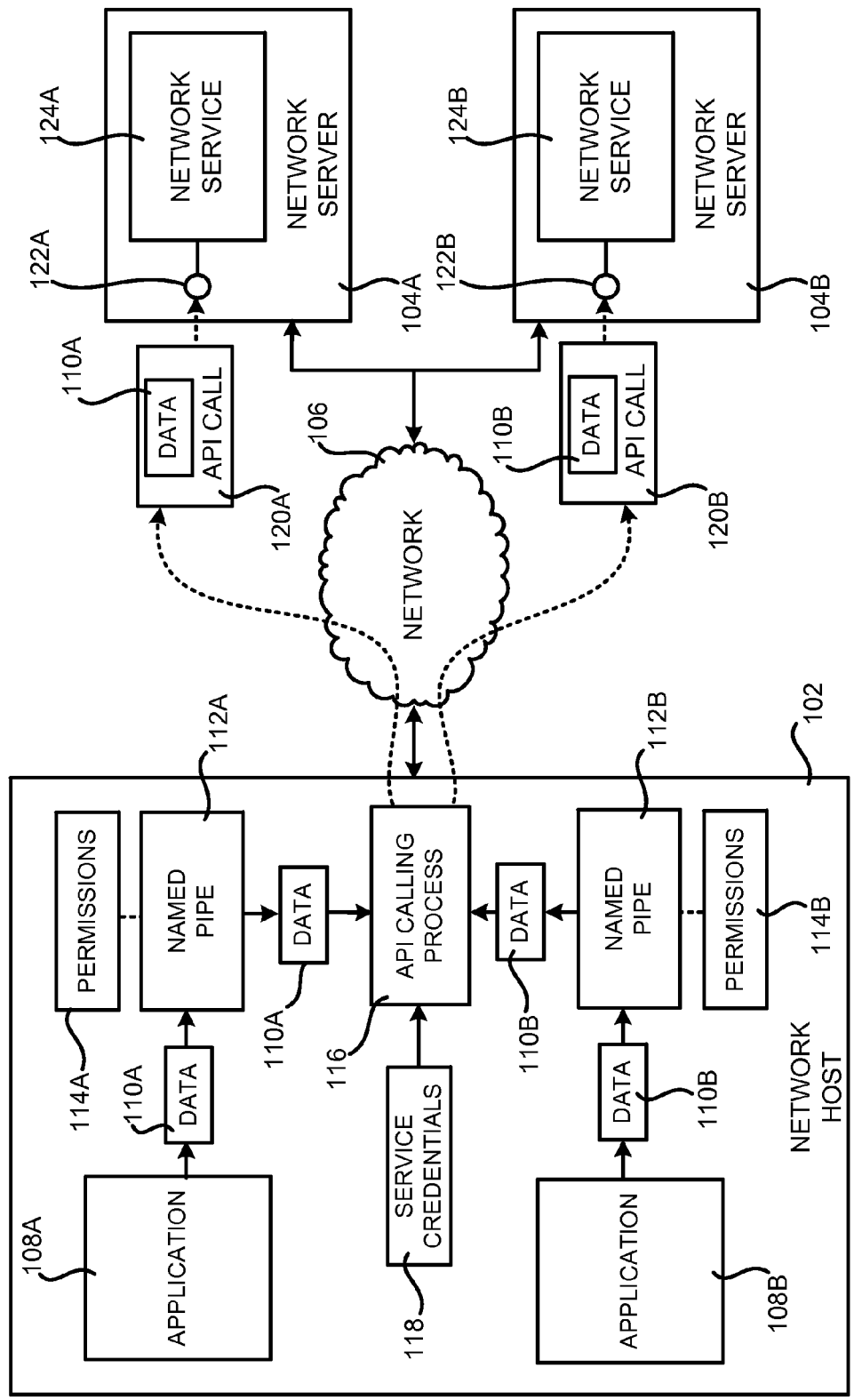

FIG. 6 is a system diagram showing aspects of another illustrative mechanism presented herein for providing access to an API through a named pipe. In the embodiment shown in FIG. 6, a single instance of the API calling process 116 is configured to receive data 110A-110B by way of two or more named pipes 112A-112B, respectively. Each of the named pipes 112A-112B may have independent permissions 114A-114B that specify the applications 108 that are authorized to write data to the respective named pipe 112.

In the example shown in FIG. 6, the application 108A has permissions 114A to write data 110A to the named pipe 112A. The data 110A is then provided by way of the named pipe 112A to the API calling process 116. In response to receiving the data 110A, the API calling process 116 might identify the service credentials 118 to utilize in an API call 120A based on the contents of the data 110A, or based upon the identity of the named pipe 112A to which the data 110A was written. For instance, in the example shown in FIG. 6, if data is written to the named pipe 112A, the API calling process 116 utilizes service credentials 118 associated with the application 108A.

In a similar fashion, the application 108B has also been provided permissions 114B to write data 110B to the named pipe 112B. When the API calling process 116 receives the data 110B, the API calling process 116 determines the service credentials 118 to utilize for an API call 120B based upon the data 110B, or the identity of the named pipe 112B to which the data 110B was written. Additionally, the API calling process 116 might determine the particular API 122A-122B to call based upon the contents of the data 110A-110B, the named pipe 112A-112B to which the data 110A-110B was written or based on the application 108A-108B submitting the data 110A-110B.

Once the API calling process 116 has identified the appropriate service credentials 108 and the appropriate API 122 to call, the API calling process 116 utilizes the credentials 118 to generate the API call 120. For instance, in the example shown in FIG. 6, the API calling process 116 generates an API call 120A that includes the data 110A written to the named pipe 112A by the application 108A. The API call 120A is made to the API 122A exposed by the network service 124A executing on the network server 104A. Likewise, the API calling process 116 creates an API call 120B that includes the data 110B written to the named pipe 112B by the application 108B. The API call 120B is made to the API 122B exposed by the network service 124B executing on the network server 104B. Additional details regarding this mechanism and the mechanism described above with regard to FIG. 5 will be provided below with regard to FIG. 7.

Figure 7:
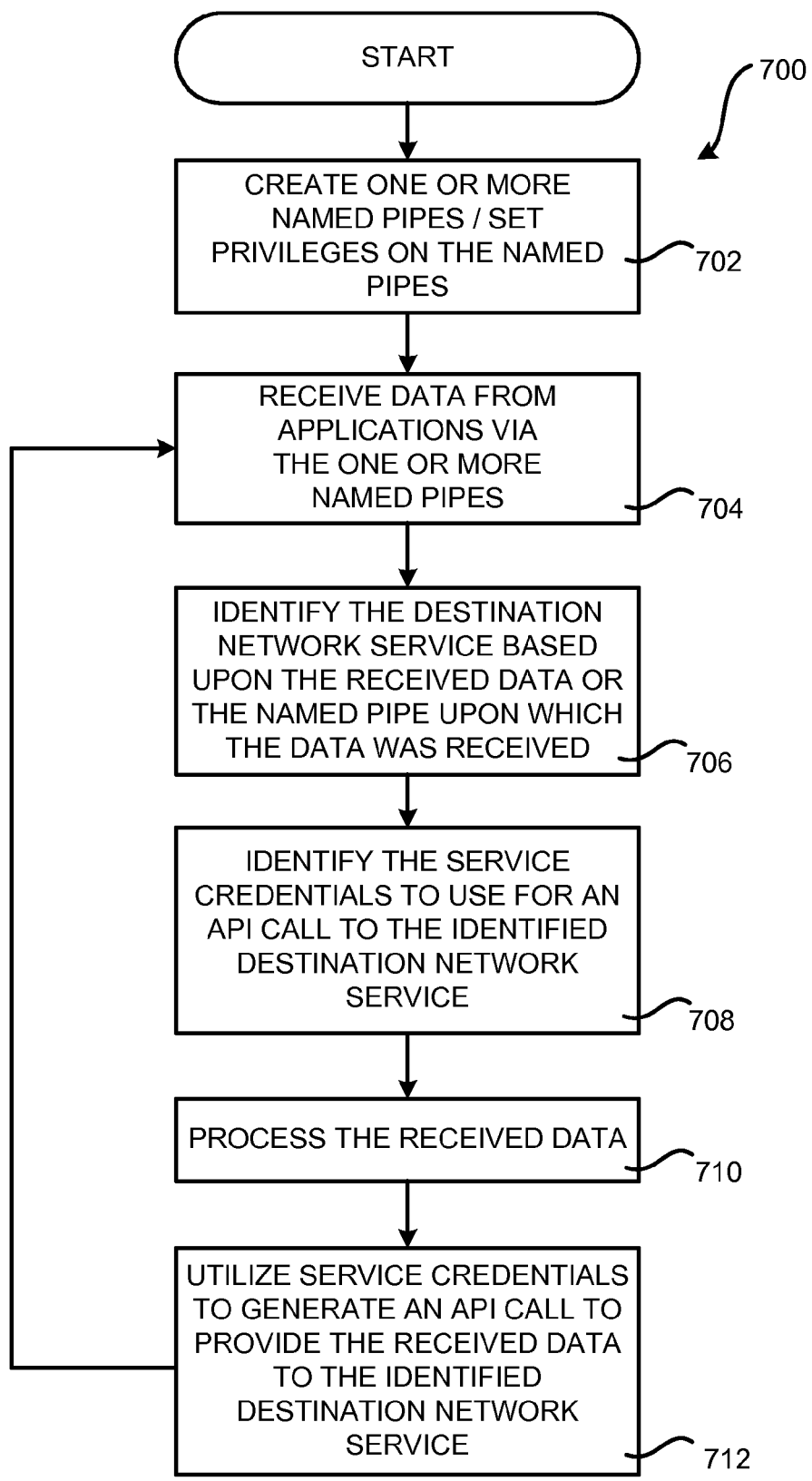
FIG. 7 is a flow diagram showing an illustrative routine that describes aspects the operation of the mechanism shown in FIGS. 5 and 6 for providing access to an API through a named pipe.

FIG. 7 is a flow diagram showing an illustrative routine 700 that describes aspects of the operation of the mechanism shown in FIGS. 5 and 6 for providing access to an API 122 through a named pipe 112. The routine 700 begins at operation 702, where the API calling process 116 or another process creates one or more named pipes 112A-112B on the network host 102. Additionally, as described above, the API calling process 116 or another process can set permissions 114A-114B, respectively, on the created named pipes 112A-112B. The permissions 114A-114B specify the applications 108 and/or other processes that are authorized to write data to the created named pipes 112A-112B, respectively.

From operation 702, the routine 700 proceeds to operation 704, where the API calling process 116 receives data 110A or data 110B by way of the named pipes 112A-112B, respectively. The routine 700 then proceeds to operation 706, where the API calling process 116 identifies the destination API 122 for the received data 110 based upon the contents of the received data 110, as illustrated above with regard to FIG. 5, or based upon the named pipe 112 to which the data was written, as discussed above with reference to FIG. 6.

From operation 706, the routine 700 proceeds to operation 708, where the API calling process 116 identifies the service credentials 118 to utilize for an API call 120 to the identified API. As discussed above, the service credentials 118 to be utilized may be identified based upon the API 122 to be called, the application 108 that submitted the data 110 to the named pipe 112, the named pipe 112 upon which the data 110 was received, and/or other factors.

Once the destination API 122 and the appropriate service credentials 118 have been identified, the routine 700 proceeds to operation 710. At operation 710, the API calling process 116 processes the received data 110. As discussed above, this might include translating, formatting, and/or batching the received data. Other types of processing might also be performed prior to generating an API call with the data.

From operation 710, the routine 700 proceeds to operation 712, where the API calling process 116 utilizes the identified service credentials 118 to provide the received data 110 to the identified API 122. For instance, in the example shown in FIG. 6, the API calling process 116 utilizes the service credentials 118 to generate an API call 120A that includes the data 110A written to the named pipe 112A by the application 108A. The API call 120A is made to the API 122A exposed by the network service 124A executing on the network server 104A. Other such calls might also be made to other APIs 122 exposed using other technologies. From operation 712, the routine 700 proceeds to operation 714 where additional data 110 received at the API calling process 116 might be processed in a similar manner as described above.

Figure 8:
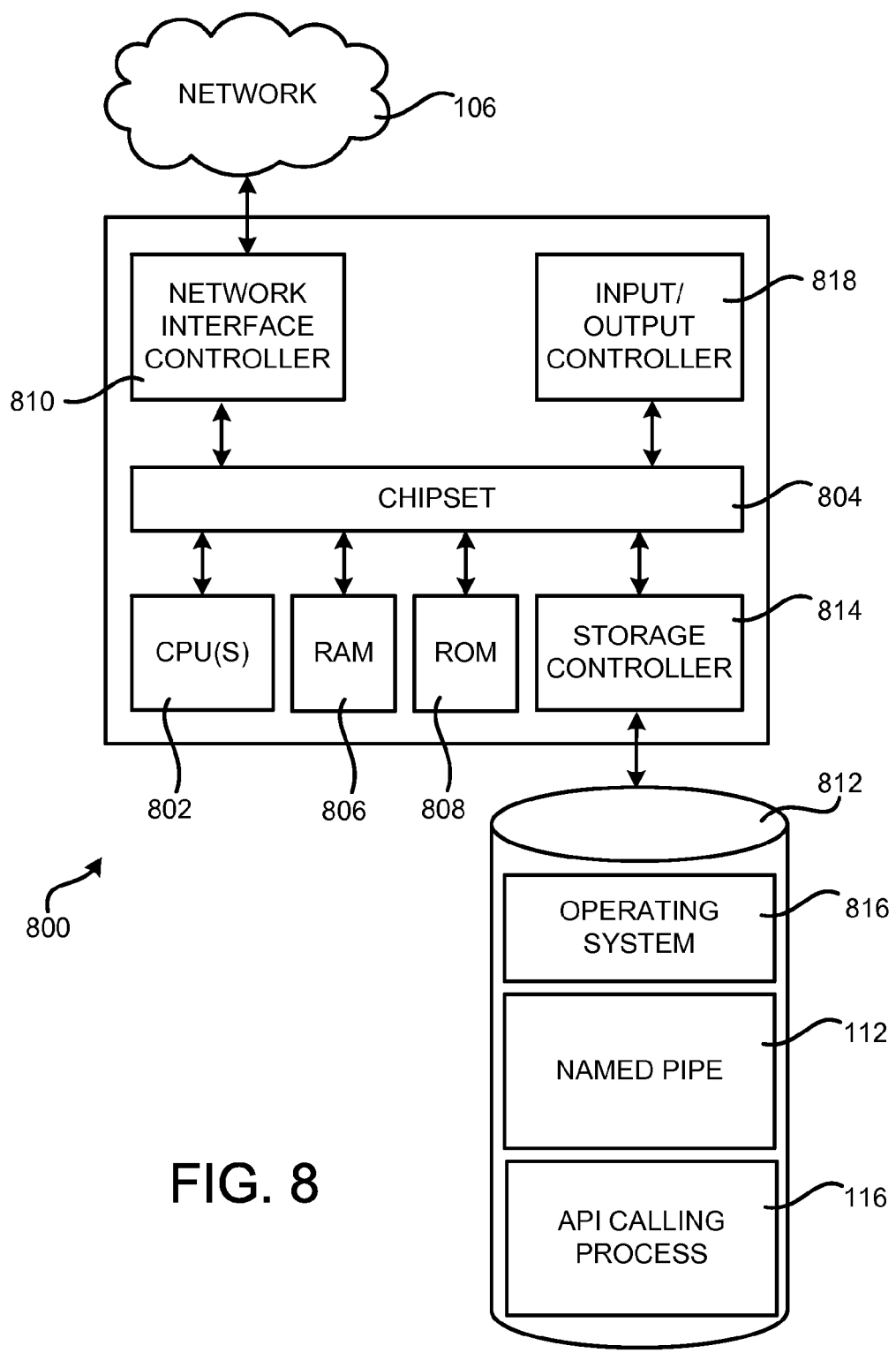
FIG. 8 is a computer architecture diagram showing one illustrative computer hardware architecture for implementing a computing device that might be utilized to implement aspects of the various embodiments presented herein.

FIG. 8 shows an example computer architecture for a computer 800 capable of executing the program components described above for providing access to an API 122 through a named pipe 112. The computer architecture shown in FIG. 8 illustrates a conventional server computer, workstation, desktop computer, laptop, tablet, smartphone, network appliance, personal digital assistant ("PDA"), e-reader, digital cellular phone, or other computing device, and may be utilized to execute the various software components presented herein.

The computer 800 includes a baseboard, or "motherboard," which is a printed circuit board to which a multitude of components or devices may be connected by way of a system bus or other electrical communication paths. In one illustrative embodiment, one or more central processing units ("CPUs") 802 operate in conjunction with a chipset 804. The CPUs 802 may be standard programmable processors that perform arithmetic and logical operations necessary for the operation of the computer 800.

The CPUs 802 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 804 provides an interface between the CPUs 802 and the remainder of the components and devices on the baseboard. The chipset 804 may provide an interface to a random access memory ("RAM") 806, used as the main memory in the computer 800. The chipset 804 may further provide an interface to a computer-readable storage medium such as a read-only memory ("ROM") 808 or non-volatile RAM ("NVRAM") for storing basic routines that help to startup the computer 800 and to transfer information between the various components and devices. The ROM 808 or NVRAM may also store other software components necessary for the operation of the computer 800 in accordance with the embodiments described herein.

The computer 800 may operate in a networked environment using logical connections to remote computing devices and computer systems through a network, such as the local area network 106. The chipset 804 may include functionality for providing network connectivity through a NIC 810, such as a gigabit Ethernet adapter. The NIC 810 is capable of connecting the computer 800 to other computing devices over the network 106. It should be appreciated that multiple NICs 810 may be present in the computer 800, connecting the computer to other types of networks and remote computer systems.

The computer 800 may be connected to a mass storage device 812 that provides non-volatile storage for the computer. The mass storage device 812 may store system programs, application programs, other program modules, and data, which have been described in greater detail herein. The mass storage device 812 may be connected to the computer 800 through a storage controller 814 connected to the chipset 804. The mass storage device 812 may consist of one or more physical storage units. The storage controller 814 may interface with the physical storage units through a serial attached SCSI ("SAS") interface, a serial advanced technology attachment ("SATA") interface, a Fibre Channel ("FC") interface, or other type of interface for physically connecting and transferring data between computers and physical storage units.

The computer 800 may store data on the mass storage device 812 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 812 is characterized as primary or secondary storage, and the like.

For example, the computer 800 may store information to the mass storage device 812 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 812 by detecting the physical states or characteristics of one or more particular locations within the physical storage units.

In addition to the mass storage device 812 described above, the computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 812 may store an operating system 816 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 812 may store other system or application programs and data utilized by the computer 800, such as the API calling process 116, the named pipe 112, and/or the other software components and data described above. The mass storage device 812 might also store other programs and data not specifically identified herein.

In one embodiment, the mass storage device 812 or other computer-readable storage media is encoded with computer-executable instructions which, when loaded into the computer 800, transforms the computer from a general-purpose computing system into a special-purpose computer capable of implementing the embodiments described herein. These computer-executable instructions transform the computer 800 by specifying how the CPUs 802 transition between states, as described above. According to one embodiment, the computer 800 has access to computer-readable storage media storing computer-executable instructions which, when executed by the computer 800, perform the routines 400 and 700, described above with regard to FIGS. 4 and 7, respectively.

The computer 800 may also include an input/output controller 818 for receiving and processing input from a number of input devices, such as a keyboard, a mouse, a touchpad, a touch screen, an electronic stylus, or other type of input device. Similarly, the input/output controller 818 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for accessing an API through a named pipe have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium having computer-executable instructions stored thereupon which, when executed by a computer, cause the computer to:
create one or more named pipes on a network host;
set one or more permissions on the named pipes to provide write access to the named pipes to one or more application programs executing on the network host that are authorized to access one or more application programming interfaces (APIs) exposed by one or more services;
receive data written to one of the named pipes by one of the application programs;
identify a destination API for the written data from the one or more APIs based upon the data written to the one of the named pipes;
process the data written to the one of the named pipes prior to performing an API call to the identified destination API; and
perform the API call that includes the processed written data to the identified destination API.

2. The computer-readable storage medium of claim 1, wherein the named pipe is stored in a directory on the network host that is associated with the destination API.

3. The computer-readable storage medium of claim 1 wherein processing the data written to the named pipe comprises placing the data written to the named pipe into a format suitable for submission to the destination API.

4. The computer-readable storage medium of claim 1, wherein processing the written data comprises batching the received data written to the named pipe with other data written to the named pipe prior to transmission to the destination API.

5. The computer-readable storage medium of claim 1, wherein the data written to the named pipe comprises one or more metrics relating to the execution of the application program writing the data to the named pipe.

6. The computer-readable storage medium of claim 1, wherein the data written to the named pipe comprises log data relating to the execution of the application program writing the data to the named pipe.

7. A computer-implemented method for accessing one or more application programming interface (APIs) through a named pipe, the method comprising performing computer-implemented operations for:
creating one or more named pipes on a network host;
setting one or more permissions on the named pipes to provide write access to the named pipes to one or more application programs executing on the network host that are authorized to access one or more APIs exposed by one or more services;
receiving data written to one of the named pipes by one of the application programs;

identifying a destination API for the written data from the one or more APIs based upon the data written to the one of the named pipes;

processing the data written to the one of the named pipes prior to performing an API call to the identified destination API; and performing the API call that includes the processed written data to the identified destination API.

8. The computer-implemented method of claim 7, wherein the written data comprises one or more metrics for the application program writing the data to the named pipe.

9. The computer-implemented method of claim 7, wherein the API call is performed utilizing a set of service credentials selected based upon the identified destination API.

10. The computer-implemented method of claim 7, wherein processing the written data comprises placing the written data into a format suitable for submission to the API.

11. The computer-implemented method of claim 7, wherein identifying a destination API for the written data comprises identifying a destination API for the written data based upon the named pipe to which the data was written.

12. A system for performing an application programming interface (API) call using a named pipe, the system comprising one or more computing devices configured to:

create one or more named pipes, set one or more permissions on the named pipes to provide write access to the named pipes to one or more application programs executing on a host that are authorized to access one or more APIs exposed by one or more services, receive data written to one of the named pipes by one of the application programs, identify a destination API based upon the data written to the one of the named pipes;

process the data written to the one of the named pipes prior to performing an API call using the written data, and perform the API call that includes the processed written data to the identified destination API.

13. The system of claim 12, wherein the data written to the named pipe comprises one or more metrics relating to the execution of the application program writing the data to the named pipe.

14. The system of claim 12, wherein the API call is performed utilizing a set of credentials selected based upon the identified destination API.

15. The system of claim 12, wherein the named pipe is created on the host executing the one of the applications writing data to the named pipe.

16. An apparatus for performing an application programming interface (API) call using a named pipe, the apparatus comprising:

a processor; and a computer-readable storage medium having computer-executable instructions stored thereupon which, when executed by the processor, cause the processor to create one or more named pipes, set one or more permissions on the named pipes to provide write access to the named pipes to one or more application programs executing on a host that are authorized to access one or more APIs exposed by one or more services, receive data written to one of the named pipes by one of the application programs, identify a destination API based upon the data written to the one of the named pipes;

process the data written to the named pipe prior to performing an API call using the written data, and perform the API call that includes the processed written data to the identified destination API.

17. The apparatus of claim 16, wherein the API call is performed utilizing a set of service credentials selected based upon the API.

18. The apparatus of claim 16, wherein the named pipe is stored in a directory that is associated with the API.

19. The apparatus of claim 16, wherein the data written to the named pipe comprises one or more metrics relating to the execution of the program writing the data to the named pipe, and wherein processing the data written to the named pipe prior to performing the API call comprises batching the data written to the named pipe with other metrics data written to the named pipe prior to transmission to the API.

\* \* \* \* \*